April 7, 1964  H. H. BASCOM  3,128,160
GLASS FIBER FILTER FOR HOT GAS DISTRIBUTION IN DRIERS
Filed April 17, 1959  4 Sheets-Sheet 1

INVENTOR.
Hollis H. Bascom
BY
Townsend and Townsend
attorneys

April 7, 1964        H. H. BASCOM        3,128,160
GLASS FIBER FILTER FOR HOT GAS DISTRIBUTION IN DRIERS
Filed April 17, 1959        4 Sheets-Sheet 2

INVENTOR.
Hollis H. Bascom
BY
Townsend and Townsend
attorneys

INVENTOR.
Hollis H. Bascom

April 7, 1964    H. H. BASCOM    3,128,160
GLASS FIBER FILTER FOR HOT GAS DISTRIBUTION IN DRIERS
Filed April 17, 1959    4 Sheets-Sheet 4
Fig. 7.
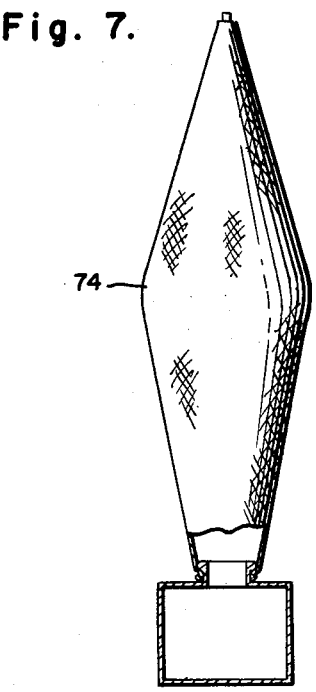
Fig. 8.
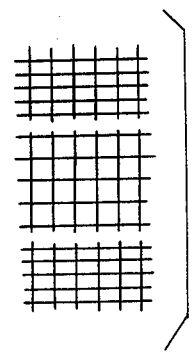
Fig. 9.
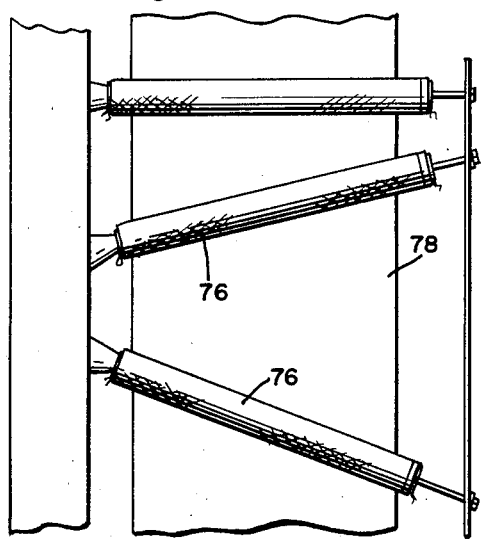
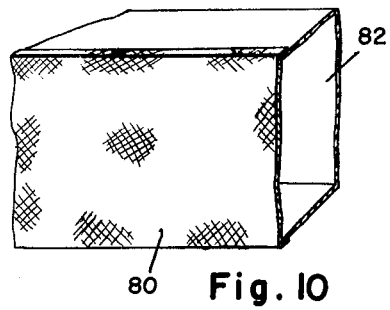
Fig. 10
INVENTOR.
Hollis H. Bascom
BY
Townsend and Townsend
attorneys

United States Patent Office 3,128,160
Patented Apr. 7, 1964

3,128,160
GLASS FIBER FILTER FOR HOT GAS DISTRIBUTION IN DRIERS
Hollis H. Bascom, Livermore, Calif., assignor to Coast Manufacturing and Supply Co., Livermore, Calif.
Filed Apr. 17, 1959, Ser. No. 807,129
4 Claims. (Cl. 34—82)

The present invention relates to improvements in hot gas filtration and distribution in driers and provides a method and apparatus for filtering the hot gases immediately prior to contact of the gases with an object to be dried without the possibility of contamination after heating.

The present invention is directed to and solves several problems in the art of drying objects with hot gases, namely, the problem of maintaining the gas clean at the point of contact with the object to be dried and also the problem of evenness and uniformity of distribution of the hot gases for proper siccative action on the object. Further, the invention allows the hot gases to be recirculated and thus prevents heat loss and affords a major fuel economy not heretofore available.

The use of the present invention also allows a maximum volume of hot gas (air) to be employed with an extremely efficient filter medium and further provides heretofore unavailable flexibility of arrangement of the hot air discharge elements in reference to the articles or material to be dried.

As regards cleanliness, the textile industry provides an example involving the displacement of lint and small fibers into drying oven systems. This foreign matter, or dust, is reentrained in the duct work, in the blowers, and in all parts of the system. Thus where a light fabric is dried in an oven previously employed for a dark fabric, it will be appreciated that very stringent cleaning procedures must first be employed to clean the entire system.

Similarly, in the drying of food products, small particle material or dust is deposited throughout the system to ultimately threaten contamination of the end product.

In the drying of painted objects, such as automobiles, a certain amount of solids in the paint, such as pigment, may become deposited throughout the lengthy metal ducts and baked therein to ultimately flake-off and be redeposited on the finish of the end product. At the present, expensive air scrubbers and washers are employed to clean the fresh air coming in, and where the air is recirculated from the oven to be used again extensive cleaning and sometimes complete replacement of the duct work has been required.

In accordance with the present invention one or more hot air plenums communicate with the interior of a drying oven upon which are mounted glass fiber filter elements such as glass fiber cloth bags. Means associated with the plenum heat and move gases, usually air, therethrough and out through the filter element into the oven, and exhaust means communicate hot gases in the oven with discharge ducts to recirculate and to reuse the hot gases. The flexible, glass fiber filter elements may be positioned substantially adjacent the object to be dried, whereby the gases are filtered immediately prior to contact with the objects and do not come in contact with duct work, blowers, heaters or other elements to contaminate the air or gas. It is, in effect, a continuous, closed system of air drying insofar as heat loss and contamination are concerned.

The present invention provides a filtration system capable of filtering gases which have been elevated to high operating temperatures ranging to about 150° to 800° F. or higher. The glass fiber cloth filter elements of the present invention can be employed for long periods with very high temperatures to effectively filter the heated gases without adverse effects upon the filter elements.

Another advantage and object of the present invention resides in the evenness and uniformity of heat distribution within the oven and upon the object to be dried. The filter bags may be easily arranged and rearranged in advantageous configurations to provide optimum siccative action for a given object. Similarly, the shape or construction of the bag and also the weave of the cloth may be varied to direct the needed volume of gases to the filter bag in a particular direction or at a particular point. For example, where a tubular bag is used and maximum hot air is desired from the center of the bag, the increased emission of air at the center point may be easily effected either by forming the bag to have a greater cross section at its center than at its ends and accordingly a larger dispensing area at this point; alternatively, the pickage of the glass fiber cloth may be varied for greater spacing of either the warp or weft threads, and accordingly greater permeability, at the center of the bag.

It will be readily appreciated that the metal plenums and duct work presently being used can be arranged into various configurations and gauged to dispense hot gases in a particular direction or at a particular point with reference to an object to be treated only by substantial and very costly renovation of the metal system.

Another advantage and feature of the present invention is to provide a continuous circulating stream of clean hot gas wherein the hot gases in the oven are reusable through recirculation. This permits a substantial saving in the cost of heating the gases over a period of time. At present, heat in the oven is ordinarily reusable only through heat exchangers which of course materially increase the cost of the installation and lose some heat in the exchange. The present invention positions the filter as the last element or object to be contacted by the gases prior to contact with the object to be dried. The filters remove at least 95% of foreign matter or dust from the gases and permit hot gases in the oven to be recirculated and refiltered, eliminating heat exchangers, and providing a continuous supply of clean hot gases.

Another object and advantage of the present invention is that it may be conveniently installed and utilized with conventional drying ovens now in use with very little modification of the latter.

The use of a tubular bag as the filter element gives a large filtering surface area and accordingly increased distribution of hot gases within a relatively small space. Also, the bags may easily be cleaned as for example by simply reversing the pressure.

Other objects of the present invention will become apparent upon reading the following specification and referring to the accompanying drawings in which similar characters of reference represent corresponding parts in each of the several views.

Figure 4:
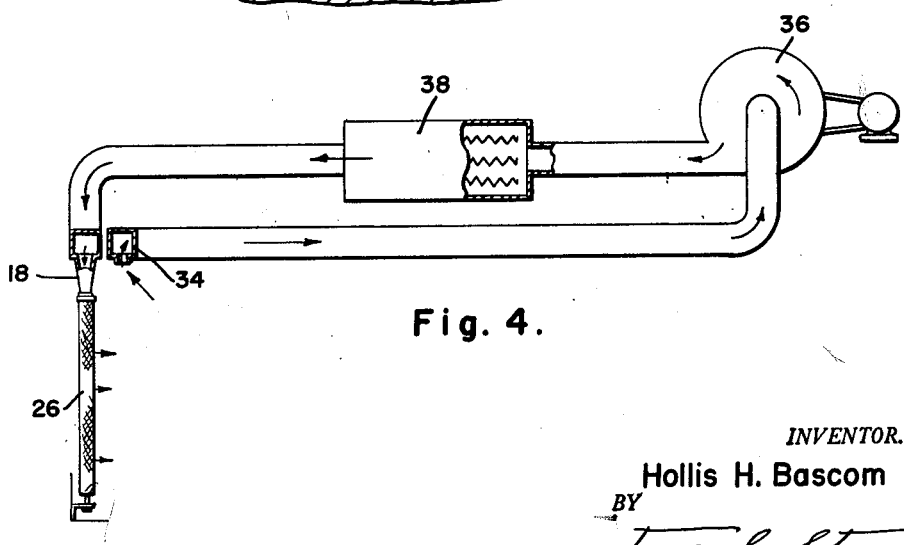
Figure 5:
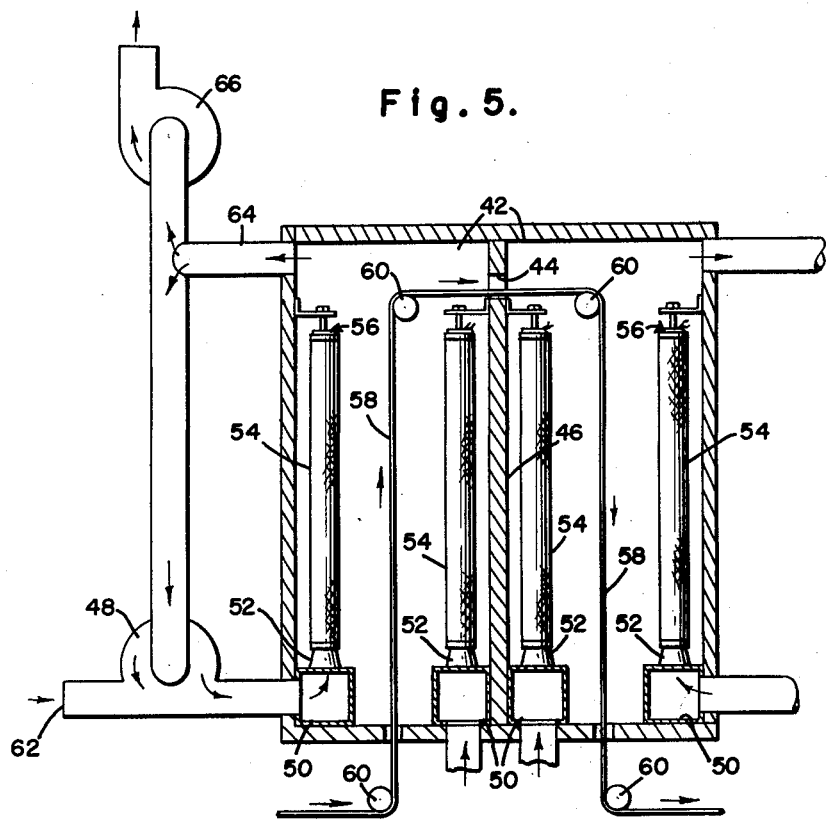
Figure 6:
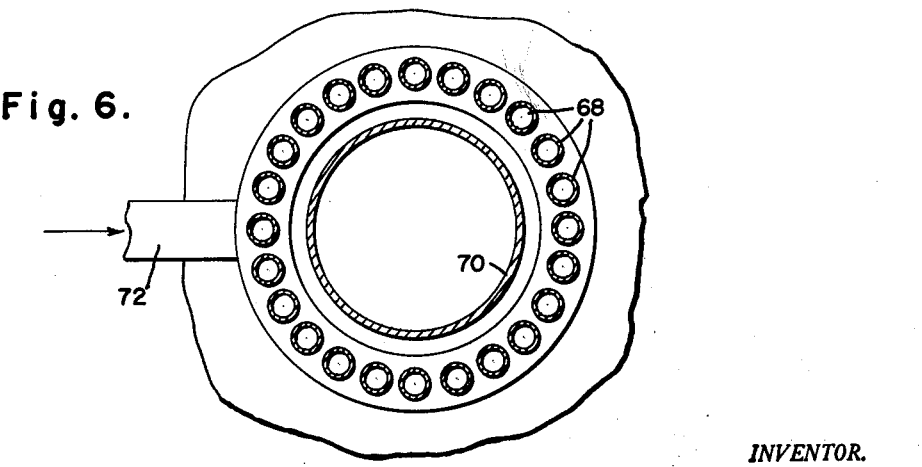

FIG. 4 diagrammatically illustrates a blower and heating element system operatively associated with an oven;

FIG. 5 illustrates a drying oven having two sections or compartments and showing a second embodiment of a drying system;

FIG. 6 is a fragmentary cross section illustating a third embodiment of the present invention;

FIG. 7 illustrates a modified filter bag having a maximum cross section at the center thereof;

FIG. 8 schematically and diagrammatically illustrates a modification of the invention;

FIG. 9 shows another arrangement of the filtering element relative to a web to be dried; and FIG. 10 schematically illustrates a segment of glass fiber cloth serving as a side of a duct.

Figure 1:
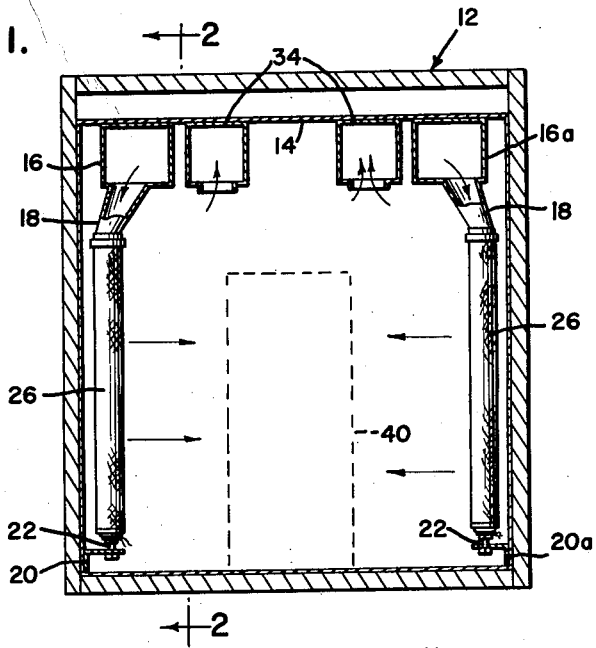
FIG. 1 shows a drying oven in cross section and illustrates one embodiment of the present invention.
Figure 2:
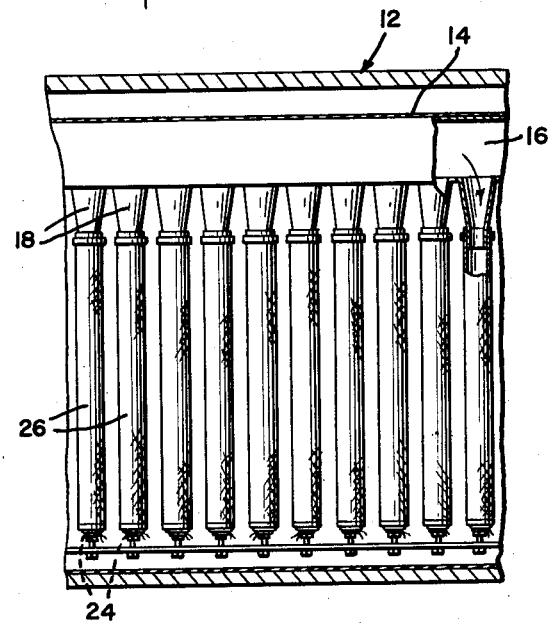
FIG. 2 is a fragmentary view taken substantially on line 2—2 of FIG. 1.

FIGS. 1 and 2 illustrate in a cross section a drying oven indicated generally at 12. The ceiling 14 of the oven carries a pair of plenums 16 and 16a which in turn carry a plurality of nozzles 18 spaced along the lower surface of each duct.

A pair of channel members 20 and 20a are disposed along the sides of the oven adjacent the floor. The channel members mount a plurality of spaced tie rods 22 mounting cup-like adapters 24, each of which receives and closes the opposite open end of the filter bags 26 which are formed of heat resistant material, preferably woven glass fiber cloth.

Figure 3:
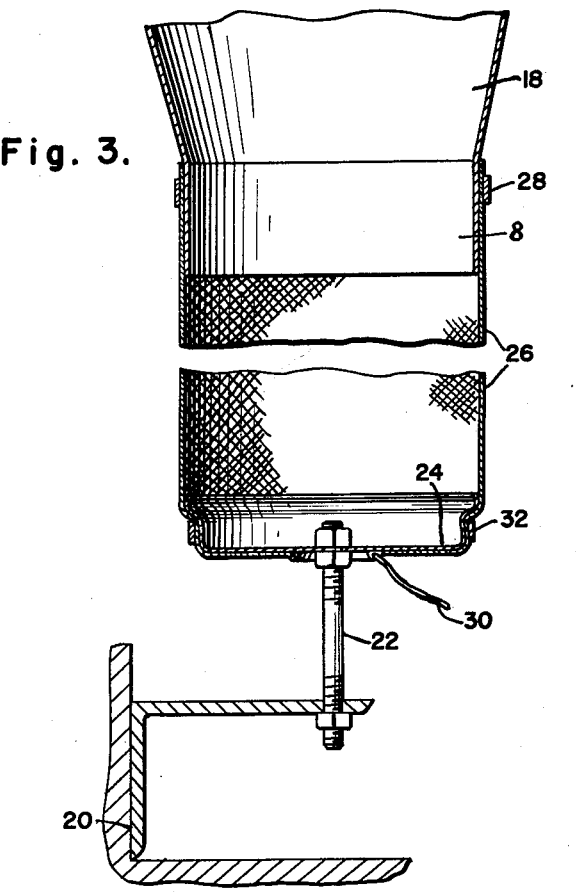
FIG. 3 is an enlarged cross section of one of the filter bags, showing the bag partly broken away, and illustrating a means for removably securing a bag in operative position.

FIG. 3 illustrates one of the filters and the means for connecting it to the plenum and adapter. The tubular filter bag is formed of glass fiber cloth and may be of any shape, preferably tubular, and is open at its ends as appears in FIG. 3. The open top of the bag is dimensioned to receive the end portion 8 of nozzle 18 and is removably secured thereto as by a band 28. The open bottom of the bag is passed over the adapter 24 and a drawstring 30 carried by the bag is tightened to secure the bag on the adapter. A second band 32 circumferentially embracing the bag and adapter secures them together.

Exhaust ducts 34 remove air from the oven, recirculate it through ducts 16, and return it after further heating through filter members 26 to the interior of the oven.

FIG. 4 schematically illustrates an air mover such as a turbine type blower 36 and a heater 38 associated with the air distribution system. Fan 36 withdraws air or gas from the oven, through exhaust duct 34 and recirculates it past heater 38 back through filter bag 26.

The embodiment is adapted to direct opposed streams of hot gases onto an object to be dried indicated at 40 in FIG. 1 in dotted line. The incoming gases are filtered through bags 26 immediately prior to contact with the object to be dried and without the filtered gases contacting any intermediate or intervening objects such as duct work, heaters, blowers or the like. Thus, a closed circuit system is made available insorfar as minimal heat loss is concerned.

FIG. 5 illustrates a second embodiment wherein the oven comprises a pair of compartments 42 which communicate through an aperture 44 in the partition 46. In this embodiment a first or intake fan 48 communicates with plenums 50 disposed in the compartments and which carry a plurality of air nozzles 52 which in turn mount filter bags 54 supported by adapters 56. The filters are arranged along the side and center walls of the oven and each wall carries sufficient filter bags to cover an area equal to the width of a web 58 such as resin impregnated cloth moving through the oven. Rollers 60 support the web so it may move between the opposed rows of filter bags and means, not illustrated, move the web continuously.

The arrangement illustrated in FIG. 5 illustrates how the filter bags may be disposed with reference to a moving web in order to get maximum drying effect with uniformity of heat application. Of course, the air emitted at right angles to the longitudinal axis of bags for impingement upon both inside and outside surface areas of the web is clean and free of all air borne, foreign contaminants which might damage or impair the surface of the material being treated.

FIG. 5 illustrates addition of fresh air and selective exhaustion. Fan 48 takes in fresh air through a vent as at 62 and passes it through a heater, not illustrated, to filters 54 where it is filtered immediately prior to contact with web 58, and exhaust duct 64 communicates with an exhaust fan 66 which partially exhausts and permits partial recirculation of the gases. The heated air passes through the pores of the filter bags in streams which are disposed perpendicular to the axes of the filter bags. Valving, not shown, may be supplied for selective intake and exhaust as desired.

FIG. 6 schematically illustrates an arrangement of the filter bags 68 wherein the filters are positioned to circumscribe a moving line of cylindrical objects 70 to be dried. In this embodiment the bags may be disposed to receive hot air entering from duct 72 to dry object 70 moving vertically past the bags.

The arrangement of FIG. 6 illustrates how the filter bags may be moved about and arranged to afford the maximum, uniform heating of an object having a geometric shape which might otherwise be difficult to dry uniformly.

FIGS. 7 and 8 illustrate two ways to vary the volume of hot gas reaching the object to be dried at given points. In FIG. 7 the cross section of the bag has been increased at its center 74 to afford an increased surface area and accordingly increased distribution of gases at this point. FIG. 8 illustrates a bag having looser pickage near the center point than adjacent the ends to increase permeability and the volume of hot gases escaping at that point.

FIG. 9 illustrates a further arangement of filter bags 76 wherein the bags might be angularly displaced relative to one another and the direction of movement of a web of material 78 in order to vary the degree of heat concentration at various points upon the web.

FIG. 10 illustrates a filter element comprising a segment of glass fibers 80 drawn taut over a plenum 82 and illustrates another method of filtering the hot air before distribution to the object to be treated.

The essence of the invention is the provision of a novel system of hot air filtration and distribution to perform a siccative function upon the object to be treated, and wherein the air filtration occurs immediately prior to contact of the air with the object to be dried to thus prevent contamination of the air stream before it performs its intended work. Thus, a most important aspect of the invention is that the last point of physical contact of the moving, heated air stream before contact with the object to be dried is the filter element, per se. As employed herein the terms "filter element," "filter bag," "filter medium" or other similar expressions is intended to mean and does include all suitable filtering elements or media capable of filtering siccative gases in the heat range employed in commercial drying operations. As set forth herein, the preferable filtering media is woven glass cloth formed as a tubular open-ended bag, but other forms and shapes, including those illustrated herein, are contemplated to be within the scope of the appended claims. Physical arrangements of filter elements may be varied considerably and those illustrated herein are merely illustrative.

Modifications and variations of arrangement of the filtering elements, their structure and position in respect to the drying oven or enclosure are contemplated so long as the essential concept is followed that the air stream discharging to the object to be treated does not contact an intervening, interfering object or article after being subjected to filtration.

Again, the circuitry and structure of the oven in reference to the parts of the air distributing system may be varied in accordance with the skill of the art.

What is claimed is:

1. A hot gas drying system including an oven; a plenum communicating with the interior of said oven; a glass fiber filter bag removably carried by said plenum interiorly of said oven; first means associated with said plenum to blow gas therethrough and through said filter bag into said oven; second means associated with said plenum to heat the gas prior to passage through said filter bag; and exhaust means communicating the interior of said oven with said plenum, first and second means and operable to exhaust gases from said oven and recirculate at least a portion of the same through said plenum and associated first and second means.

2. A hot air filter and distributing device for drying articles in an enclosure comprising a woven glass cloth member located in said enclosure, means to supply heated air to said glass cloth, means to heat the air, and means to force the heated air through the glass cloth to perform siccative action on the article to be treated, means to recirculate the air for reuse, and said woven cloth member being provided with a geometric shape calculated to provide at least two predetermined areas of different volume of hot air emitted therefrom upon an object to be treated from preselected locations on said member.

3. A hot air drier for articles comprising an oven arranged to contain an object to be dried, air discharge means communicating with the interior of said oven member, air exhaust means communicating with the interior of said oven member, means to heat air before discharge into said oven, air filter means in said oven connected to said discharge means and arranged to emit filtered, heated air directly upon the object to be heated, said filter means being the last element in the path of flow of said heated air prior to contact with said object to be dried, means to move said air through said heater and filter means for recirculation and refiltration thereof, said filter means comprising a plurality of air-porous glass cloth filter bags having an operative filter area of substantially greater magnitude than the cross-sectional area of the connection of said filter means and said air discharge means, and means to selectively physically arrange said bags relative to the object to be dried.

4. A hot air drier for articles comprising an oven arranged to contain an object to be dried, air discharge means communicating with the interior of said oven, air exhaust means communicating with the interior of said oven, means to heat air prior to discharge into the oven, means to move said air for discharge into the oven, means to move said air for discharge and exhaust, air filter means in said oven connected to said air discharge means, said filter means comprising a plurality of spaced airporous filter bags formed of woven glass cloth and disposed in the path of travel of said heated air so as to simultaneously filter and discharge said air within said oven upon the object to be heated in a random pattern, said bags being elongated having a substantially greater operative filter area than the cross-sectional area of the connection of said bags and said air discharge means.

References Cited in the file of this patent

UNITED STATES PATENTS

| | | |
|---|---|---|
| 1,513,474 | Ayres et al. | Oct. 28, 1924 |
| 1,700,994 | Buck | Feb. 5, 1929 |
| 1,950,006 | Lydon | Mar. 6, 1934 |
| 2,066,847 | McShea | Jan. 5, 1937 |
| 2,095,166 | Brickett et al. | Oct. 5, 1937 |
| 2,214,821 | Lucius | Sept. 17, 1940 |
| 2,239,572 | Richa | Apr. 22, 1941 |
| 2,561,652 | Doolan | July 24, 1951 |
| 2,576,226 | Huber et al. | Nov. 27, 1951 |
| 2,668,367 | Chedister | Feb. 9, 1954 |
| 2,897,601 | Hulton et al. | Aug. 4, 1959 |